United States Patent
Zeng et al.

(10) Patent No.: US 7,054,035 B2
(45) Date of Patent: May 30, 2006

(54) METHOD AND SYSTEM FOR MANAGEMENT OF COLOR THROUGH CONVERSION BETWEEN COLOR SPACES

(75) Inventors: Huanzhao Zeng, Vancouver, WA (US); Kevin R Hudson, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 826 days.

(21) Appl. No.: 10/004,009

(22) Filed: Oct. 29, 2001

(65) Prior Publication Data

US 2003/0081060 A1   May 1, 2003

(51) Int. Cl.
    *G06F 15/00*   (2006.01)
(52) U.S. Cl. .................. 358/1.9; 358/518; 358/525; 382/167; 345/601; 345/602; 345/603; 345/604
(58) Field of Classification Search ................. 358/1.9, 358/523, 518, 520, 525, 516, 1.12, 529; 382/164, 382/167; 345/600–604, 594; 348/232; 715/722; 101/494
See application file for complete search history.

(56) References Cited

U.S. PATENT DOCUMENTS

| | | | |
|---|---|---|---|
| 5,012,163 A | 4/1991 | Alcorn et al. | |
| 5,381,349 A | 1/1995 | Winter et al. | |
| 5,402,245 A | 3/1995 | Motta et al. | |
| 5,473,446 A | 12/1995 | Perumal, Jr. et al. | |
| 5,539,540 A * | 7/1996 | Spaulding et al. | 358/518 |
| 5,579,446 A | 11/1996 | Naik et al. | |
| 5,619,347 A * | 4/1997 | Taniguchi et al. | 358/516 |
| 5,657,137 A | 8/1997 | Perumal, Jr. et al. | |
| 5,704,021 A | 12/1997 | Smith et al. | |
| 5,731,823 A | 3/1998 | Miller et al. | |
| 5,732,151 A | 3/1998 | Moon et al. | |
| 5,872,895 A * | 2/1999 | Zandee et al. | 358/1.9 |
| 5,917,994 A | 6/1999 | Perumal, Jr. et al. | |
| 5,963,201 A * | 10/1999 | McGreggor et al. | 715/722 |
| 5,978,011 A | 11/1999 | Jacob et al. | |
| 6,015,207 A | 1/2000 | Winter et al. | |
| 6,040,927 A | 3/2000 | Winter et al. | |
| 6,075,888 A * | 6/2000 | Schwartz | 382/167 |
| 6,137,595 A * | 10/2000 | Sakuyama et al. | 358/1.9 |
| 6,169,609 B1 | 1/2001 | Jacob et al. | |
| 6,225,974 B1 | 5/2001 | Marsden et al. | |
| 6,226,011 B1 * | 5/2001 | Sakuyama et al. | 345/600 |
| 6,257,693 B1 | 7/2001 | Miller et al. | |
| 6,337,692 B1 * | 1/2002 | Rai et al. | 345/594 |
| 6,377,355 B1 * | 4/2002 | Kumada | 358/1.12 |
| 6,529,291 B1 * | 3/2003 | Schweid et al. | 358/1.9 |
| 6,744,534 B1 * | 6/2004 | Balasubramanian et al. | 358/1.9 |
| 6,778,300 B1 * | 8/2004 | Kohler | 358/529 |
| 6,967,746 B1 * | 11/2005 | Walker et al. | 358/1.9 |
| 2002/0027603 A1 * | 3/2002 | Kuwata et al. | 348/232 |

(Continued)

FOREIGN PATENT DOCUMENTS

EP    0 665 680    8/1995

(Continued)

*Primary Examiner*—Kimberly Williams
*Assistant Examiner*—Beniyam Menberu

(57) ABSTRACT

A method of mapping a color produced by an image device in a presentation color space to a destination color space including steps of receiving the color from the image device, determining if color is to be preserved, converting the color to the destination color space using a default profile if it is determined that color is to be preserved, and converting the color to the destination color space using a device-specific profile absent a determination that color is to be preserved.

6 Claims, 6 Drawing Sheets

U.S. PATENT DOCUMENTS

| | | | |
|---|---|---|---|
| 2002/0029715 A1* | 3/2002 | Ogatsu et al. | 101/494 |
| 2002/0075491 A1* | 6/2002 | Bares | 358/1.9 |

FOREIGN PATENT DOCUMENTS

| | | |
|---|---|---|
| EP | 0 687 103 | 12/1995 |
| EP | 0 793 377 | 9/1997 |
| EP | 0 800 310 | 10/1997 |
| WO | WO 95/31794 | 11/1995 |
| WO | WO 96/01467 | 1/1996 |

* cited by examiner

METHOD AND SYSTEM FOR MANAGEMENT OF COLOR THROUGH CONVERSION BETWEEN COLOR SPACES

FIELD OF THE INVENTION

The present invention relates generally to color management systems, and more particularly, to a method and system for preserving colors from one color space to another.

BACKGROUND

Color processing is a fairly well developed and complex science. Many different color interpolation techniques have been proposed and used. In 1931 the Commission Internationale L'Eclairage (CIE) defined a perceptual color space that represents all colors that can be perceived by the human eye. The millions of different colors perceivable by the, human eye are based on varying levels of red, green and blue integrated by the eye. It has been found possible and convenient to represent colors by a three-dimensional spatial construction, or color space, using XYZ coordinates. CIE established a standard coordinate system so that consistent color data may be communicated between devices. This is known as the CIE XYZ coordinate system. A variety of trichromatic (or three color) modeled systems provide alternatives for both hardware and software system designers. A red, green, blue (RGB) system has typically been used in computer video displays and a cyan, magenta, yellow (and black) (CMY(K)) system has typically been used in color hardcopy devices. These colors are typically referred to as primary colors. Colors in these systems may be represented as [R,G,B] (including Red Green and Blue color component values) and [C,M,Y] (including Cyan, Magenta and Yellow color component values).

Color devices, such as video monitors and color printers, present images in device-dependent forms. This means that the color produced for each individual pixel by a monitor on its screen is unique to each device. Similarly, the color produced for each individual pixel by a printer is unique to that printer. Because of this device-dependent design, the same [R,G,B] values may produce very different colors when displayed on different model monitors or different model printers. This device dependence also causes problems when converting [R,G,B] values to [C,M,Y] values for printing, particularly where the source monitor is unknown.

Each device has a range of colors that it is able to produce, referred to as its color gamut. More importantly, different devices may produce different colors from the same input color representation. In most instances, different devices are not capable of producing the same range of colors. This causes problems, particularly when colors are communicated between devices that employ different color spaces.

There are many approaches to reproducing reliable and desirable colors as color images are communicated through an image processing system. One intuitive approach is to fix a source device and a destination device, and to calibrate the system for the color transformation from the source color space to the destination color space. This kind of image processing system is referred to as a closed-loop system. Because both the source primary colors and destination primary colors are known in the color calibration step, a color transformation look-up table may be created in a way which allows an input primary to be mapped accurately onto a corresponding output color space. Input primaries thus may be preserved in the output.

Although a closed-loop system may be easy to calibrate, it may be problematic to assume such a system as the world moves toward a more network-oriented, open architecture. Because an open-architecture system may employ unknown source and destination color image devices, a closed-loop approach may not be capable of accurately calibrating an open-architecture system. However, device-dependent color images from different color image devices may be converted into a device-independent color space, making it easier to maintain color specifications across plural devices. A color management system based on a well-defined color system, such as a CIE XYZ color space, as a connection bridge meets the requirement for network based color-imaging systems.

The International Color Consortium (or ICC) has defined a color management scheme for consistent color data communication. The profile connection space (PCS) is the heart of the ICC color management scheme, which utilizes CIE XYZ or CIE L*a*b* color spaces. Color transformation according to the ICC color management scheme is based on a Device-PCS-Device model. Any color from a device is communicated through the PCS to another device. In the currently-used ICC color management method, a source color is converted from the source color space to the PCS color space (typically the CIE XYZ color space if the source device is a monitor), and then is converted to the destination color space. However, none of the source primary data is passed through to the destination, and thus no data adjustment can be performed there for primary preservation. Because of this primary mismatch problem, utility of an ICC color management system may be limited.

For example, yellow primary matching is usually desired for printing Microsoft PowerPoint documents using an ink-jet printer. Many printers, it will be appreciated, utilize a yellow primary ink. However, a standard ICC color management system may not achieve primary matching because source primaries are not passed through to the destination color space. The printer only receives the PCS-converted color data, data which may not represent a desired yellow primary due to the PCS conversion and other conversions that may occur.

Another difficulty with preserving primary colors in conventional color management systems relates to interpolation error, which may arise upon conversion from one color space to another. It is noted, for example that, monitors typically use 8-bit color. This means that each trichromatic color may have $2^8$ (or 256) different values. Therefore, a very accurate conversion table (or look-up table) for converting colors from one color space to another would be 256×256×256 in size. This is very large, even by modern processor and memory standards. Accordingly, a look-up table (e.g. a 17×17×17 look-up table) typically is used. Colors that lie between values in the look-up table typically are interpolated. This causes problems as each interpolation introduces inaccuracies that effect changes in the color coordinates.

SUMMARY OF THE INVENTION

The present invention provides a method of mapping a color produced by an image device in a presentation color space to a destination color space including steps of receiving the color from the image device, determining if color is to be preserved, converting the color to the destination color space using a default profile if it is determined that color is to be preserved, and converting the color to the destination color space using a device-specific profile absent a determination that color is to be preserved.

DETAILED DESCRIPTION OF THE INVENTION

Figure 1:
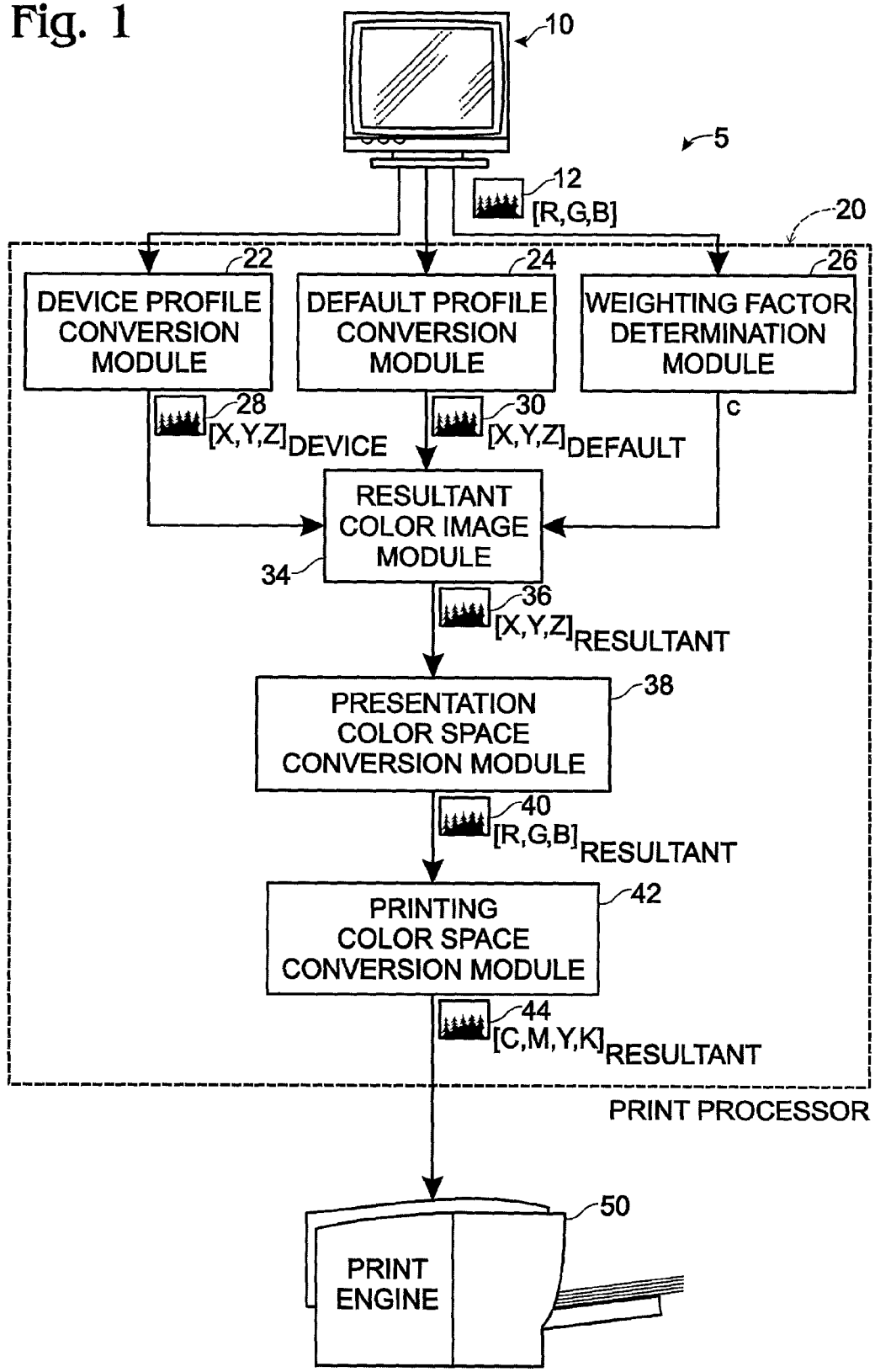
FIG. 1 is a flow diagram demonstrating operation of an image device, a print engine and a print processor, which collectively perform color space transformations in accordance with one embodiment of the present invention.

Referring initially to FIG. 1, an image processing system is shown generally at 5, such image processing system employing an image device 10, a print processor 20, and a print engine 50 configured to print images presented on the image device. Image device 10 may take various forms, including, for example, an electronic display, a scanner, a digital camera, etc. Similarly, print engine 50 may take various forms, including a color printer, facsimile device, etc. Print processor 20 may form a part of a printer (or other device) incorporating print engine 50, or may be resident in a separate print server serving one or more printing devices.

In accordance with one aspect of the invention, image device 10 is configured to produce a color image 12, typically in a presentation color space such as RGB color space, which is employed by many display monitors. It will be appreciated, however, that the presentation color space may be virtually any color space, including RGB color space, CMY color space, CMYK color space or some other color space. It also will be appreciated that color image 12 may be a solitary pixel, a grouping of pixels, or an entire image produced by image device 10. For simplicity, the color image referred to herein is considered to be a single pixel (and thus of a single color), but the invention should not be considered to be limited in this sense.

As indicated in FIG. 1, print processor 20 receives color image 12 from image device 10 and routes such color image to a device profile conversion module 22, a default profile conversion module 24, and a weighting factor determination module 26. Color image 12, it will be noted, is designated by $[R,G,B]_{SOURCE}$, indicating that color image 12 is a source image from image device 10 in the RGB color space (with red, green and blue color components). Thus, in the present example, the presentation color space is RGB color space.

In accordance with the invention, device-profile conversion module 22 converts color image 12 from the presentation color space to a destination color space (designated herein as XYZ color space). The device-profile conversion module typically utilizes a device-specific profile of image device 10 to make a device-specific conversion of color image 12 from the presentation color space (e.g. RGB color space) associated with image device 10 to the destination color space (e.g. CIE XYZ color space). Thus, device-profile conversion module 22 may be employed to produce a device-specific color image 28 in the destination color space. Device-specific color image 28 is designated herein by $[X,Y,Z]_{DEVICE}$, indicating that color image 28 is a device-specific image in destination CIE XYZ color space.

The device-specific profile of image device 10, it will be appreciated, may be provided to device-profile conversion module 22 along with color image 12, may be available from onboard memory, or may be available from some other source. Furthermore, it is to be understood that although the destination color space referred to herein is the destination CIE XYZ color space, the destination color space could similarly be CIE L*a*b color space, or some other standardized color space.

Also in accordance with the invention, default-profile conversion module 24 may be configured to utilize a default profile to convert color image 12 from the presentation color space (e.g. RGB color space) associated with image device 10 to the destination color space (e.g. CIE XYZ color space). Default-profile conversion module 24 thus may be employed to produce a default color image 30 in the destination color space. The default profile may be the same as the device-specific profile, or may be derived from a review of the capabilities of an exemplary image device and/or from a national or an international standardized color space. Default color image 30 is designated herein by $[X,Y,Z]_{DEFAULT}$, indicating that color image 30 is a default image in destination CIE XYZ color space. The default profile may be available to default-profile conversion module 24 from onboard memory, or may be available from some other source, including print engine 50.

Although weighting factor determination module 26 receives color image 12, it typically does not convert the color image from the presentation color space to some other color space. Rather, weighting factor determination module 26 may be configured to determine hue angle of (θ) each pixel of color image 12. The hue angle of a pixel, it will be appreciated, may be determined in a variety of ways, including by calculation from the R, G and B values of the pixel. Such hue angle, in turn, may serve as an identifier of a weighting factor c of each pixel, as will be explained further below. The weighting factor may be determined using a look-up table, a weighting function or some other mechanism for relating hue angle to weighting factor. Such look-up table may be stored in memory, either in print processor 20, or at some other location accessible by the weighting factor determination module. For a given color image, it will be appreciated that c is actually a string of c values, one for each pixel of the color image.

In accordance with the present invention, the hue angle may be assigned a weighting factor based on proximity of the pixel color to a color that is to be preserved. The to-be-preserved color may be a primary color, such as red, green, blue, cyan, yellow, or magenta, or any other color which may be defined in the presentation color space. In the present embodiment, weighting function c is set to 0 where the pixel color corresponds to a to-be-preserved color (as determined by hue angles). The weighting factor is set to 1 where the pixel color differs sufficiently from the to-be-preserved color so that no component of the color is to be preserved (again, as determined by hue angle). In one embodiment, the weighting factor varies linearly from 0 to 1 as the hue angle moves from a hue angle corresponding to the to-be-preserved color to a hue angle of a color where no component is to be preserved (typically through a span of +/−30 degrees from the hue angle of the to be-preserved color).

Referring still to FIG. 1, it will be noted that resultant color image module 34 receives device-specific color image 28, default color image 30, and weighting factor c, each from a respective module as described above. As indicated, device-specific color image 28 and default color image 30 are both defined in the destination color space (typically, the CIE XYZ color space). Resultant color image module 34 thus may utilize device-specific color image 28, default color image 30 and weighting factors c (for each pixel) to produce a resultant color image 36, again in the destination color space. Resultant color image 36 is designated herein by $[X,Y,Z]_{RESULTANT}$, indicating that color image 36 is a resultant image of this operation, in destination CIE XYZ color space.

The color of each pixel of resultant color image 36 may correspond to the color of that same pixel in device-specific color image 28, may correspond to the color of that same pixel in default color image 30, or may be some hybrid or derivative of the two colors. Accordingly, in one embodiment of the invention, if it is determined that a color is to be preserved, c is set to 0 and the pixel color in resultant color image 36 is set to the pixel color from device-specific color image 28. If it is determined that a color is not to be preserved, c is set to 1 and the pixel color in resultant color image 36 is set to the pixel color from the default color image 30.

Therefore, the resultant color image 36 may be considered to be produced in accordance with the formula:

$$c*[X,Y,Z]_{DEVICE}+(1-c)*[X,Y,Z]_{DEFAULT}=>[X,Y,Z]_{RESULTANT}$$

where $[X,Y,Z]_{DEVICE}$ is a device-profile-converted color of a pixel of device-specific color image 28, $[X,Y,Z]_{DEFAULT}$ is a default-profile-converted color of the corresponding pixel of default color image 30, and c is a weighting factor determined by proximity of the corresponding source pixel's color ($[R,G,B]_{SOURCE}$) to a color which is to be preserved. $[X,Y,Z]_{RESULTANT}$ is a resultant color of the corresponding pixel of resultant color image 36.

In the simple case described above, c may be 0 for colors which are to be preserved, and set to 1 for colors which are not to be preserved. However, it is contemplated that c may vary between zero and 1 to provide for a more gradual transition between use of the device-specific color image color $[X,Y,Z]_{DEVICE}$ and the default color image color $[X,Y,Z]_{DEFAULT}$ as will be described below. It will be noted that the $[X,Y,Z]_{DEVICE}$ weighting function (c, used to weight the device-specific color image 28) and the $[X,Y,Z]_{DEFAULT}$ weighting function ((1−c), used to weight default color image 30) combine to produce unity.

Upon creation, resultant color image 36 may be converted back to the presentation color space by a presentation color space conversion module 38, such conversion typically being effected to reduce interpolation errors in later conversion to the printing color space (e.g. to the CMYK color space). Interpolation errors, it will be appreciated, may arise due to interpolation within a printing color space look-up table (which may not directly include the primary color, but rather rely on interpolation). This interpolation may introduce error, (for example, due to rounding) when converting to the printing color space. By first converting back to the presentation color space (e.g. the RGB color space), interpolation may be minimized due to overlap of presentation color space primaries and non-interpolated points in the printing color space look-up table.

Accordingly, presentation color space conversion module 38 may be considered to produce resultant color image 40 in the presentation color space. Resultant color image 40 thus is designated $[R,G,B]_{RESULTANT}$, indicating that color image 40 is a resultant image in the RGB color space (the presentation color space). This converted resultant color image is communicated to a printing color space conversion module 42.

The print color space conversion module 42 may convert resultant color image 40 from the presentation color space (e.g. the RGB color space) to the printing color space (e.g. the CMYK color space). Resultant color image 44 thus is designated $[C,M,Y,K]_{RESULTANT}$, indicating that color image 44 is a resultant image in the CMYK color space (the printing color space).

The aforementioned conversions, it will be understood, may utilize linear or nonlinear conversion methods that are well known in the art to convert between color spaces. These methods include, for example, employing a look-up table, a gamma curve, a matrix, and/or Bradford conversions. Each module, it should be appreciated, could be actualized in software, firmware, hardware, or any combination thereof suitable to bring about the desired result.

Upon completion of the appropriate conversions, resultant color image 44 may be communicated to print engine 50 for printing. Resultant color image 50 typically is in the printing color space, as described above, and thus is well-suited for printing by print engine 50. Where, as here, resultant color image 44 is in the CMYK color space, it is understood that print engine 50 typically is a printer employing cyan, magenta, yellow and black (key) inks.

Figure 2:
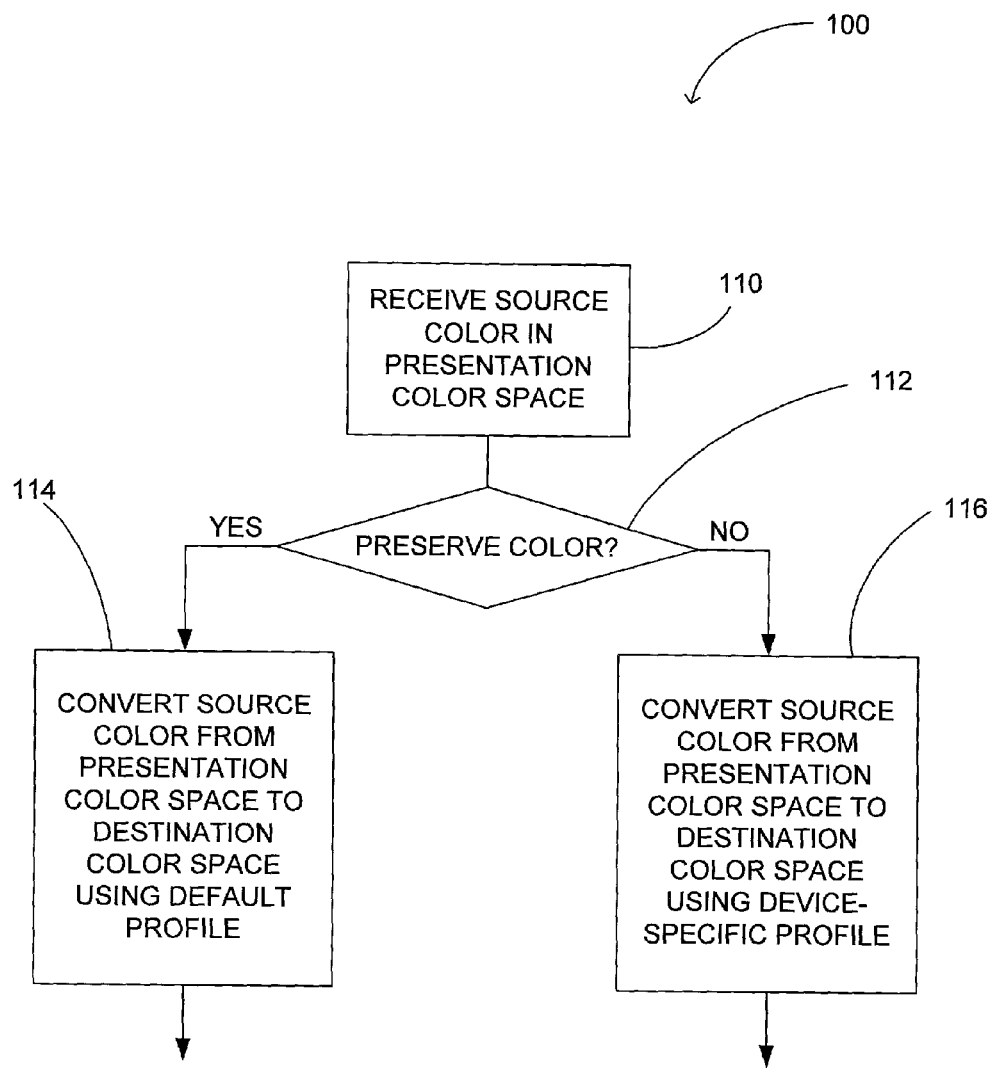
FIG. 2 is a flow diagram demonstrating conversion of a color from one color space to another while selectively preserving color.

Turning now to FIG. 2, a method of mapping a color produced by an image device to a destination color space is shown generally at 100. This method may be implemented, as described above, by print processor 20, which may form a part of a printer, a print processor, or some other device associated with print engine 50.

As indicated at 110, a source color is received from a source image device, the source color typically being represented in a presentation color space of the image device. At 112, a determination of whether source color is to be preserved is made, typically by analysis of the types of the image to be printed or by user preference. If it is determined that source color is to be preserved, the source color is converted to a destination color space using a default profile as indicated at 114. Alternatively, if it is determined that the source color is not to be preserved, or absent a determination that source color is to be preserved, the source color is converted to a destination color space using a device profile as indicated at 116.

As described in reference to FIG. 1, it will be understood that the source color described herein may correspond to a single color pixel, a grouping of same-color pixels within a greater color image, or the entire color image. The method, however, typically will be repeated for each color unit, whether such unit is a single color pixel, a grouping of same-color pixels within a greater color image, or the entire color image. The method thus typically may be repeated for each color unit (e.g. pixel) within a source color image to produce a resultant color image in the destination color space.

Figure 3:
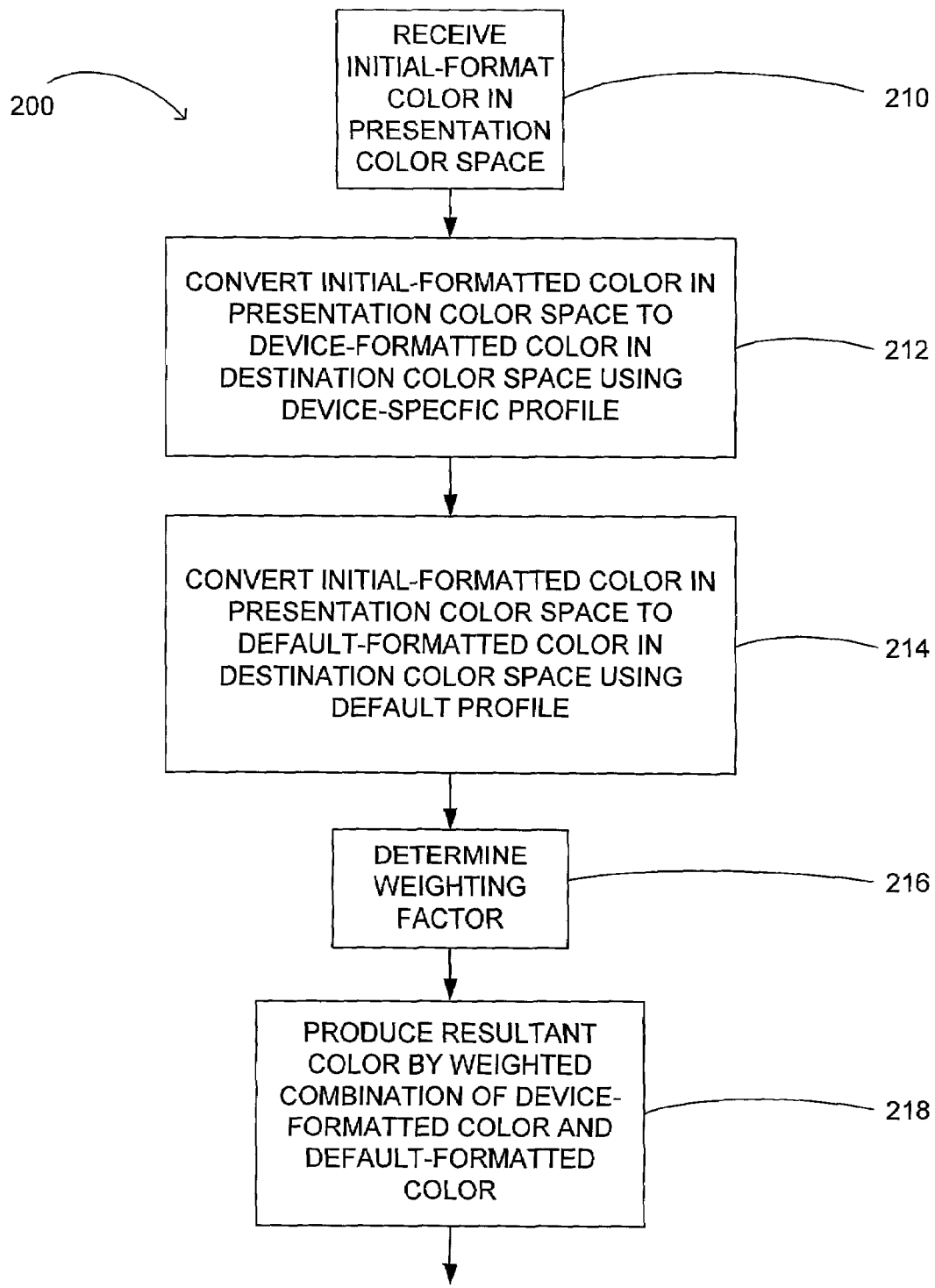
FIG. 3 is a flow diagram demonstrating conversion of a color from one color space to another color space, the conversion utilizing weighted combination of a device-specific color conversion and a default color conversion to produce a resultant color.

FIG. 3 depicts another embodiment of a method of mapping an initial-format color produced by an image device in a presentation color space to a destination color space, such method being indicated generally at 200. Again, the depicted method may be implemented by print processor 20, which may form a part of a printer, a print processor, or some other device associated with print engine 50.

As indicated at 210, a source color is received from a source image device, the source color typically being represented in a presentation color space of the image device. At 212, the source color is converted from the initial-formatted color in the presentation color space to a device-formatted color in the destination color space using a device-specific profile. At 214, the source color also is converted from the initial-formatted color in the presentation color space to a default-formatted color in the destination color space using a default profile. Although the order of these conversions is shown as first, converting using the device-specific profile, and then converting using the default profile, it will be appreciated that no particular order of these steps is necessary to implementation of the invented method.

At 216, a weighting factor is determined, typically based on hue angle of the source color, the weighting factor being suited for use in weighted combination of device-formatted color and the default-formatted color to produce a resultant color as will be described further below. Again, it will be appreciated that although determination of the weighting factor is shown herein as following the aforementioned conversions, no particular order of these steps is required.

Upon determining the weighting factor, the default-formatted color, and the device-formatted color, as just described, a resultant color is produced at 218, typically in accordance with the formula:

$$c*[X,Y,Z]_{DEVICE}+(1-c)*[X,Y,Z]_{DEFAULT} => [X,Y,Z]_{RESULTANT}$$

where $[X,Y,Z]_{DEVICE}$ is the device-formatted color, $[X,Y,Z]_{DEFAULT}$ is the default-formatted color, and c is the weighting factor. $[X,Y,Z]_{RESULTANT}$ is the resultant color produced at 218.

Again, it will be understood that the source color described herein may correspond to a single color pixel, a grouping of same-color pixels within a greater color image, or the entire color image. Method 200, however, typically will be repeated for each color unit, whether such unit is a single color pixel, a grouping of same-color pixels within a greater color image, or the entire color image. The method thus typically may be repeated for each color unit (e.g. pixel) within an source color image to produce a resultant color image in the destination color space.

Figure 4:
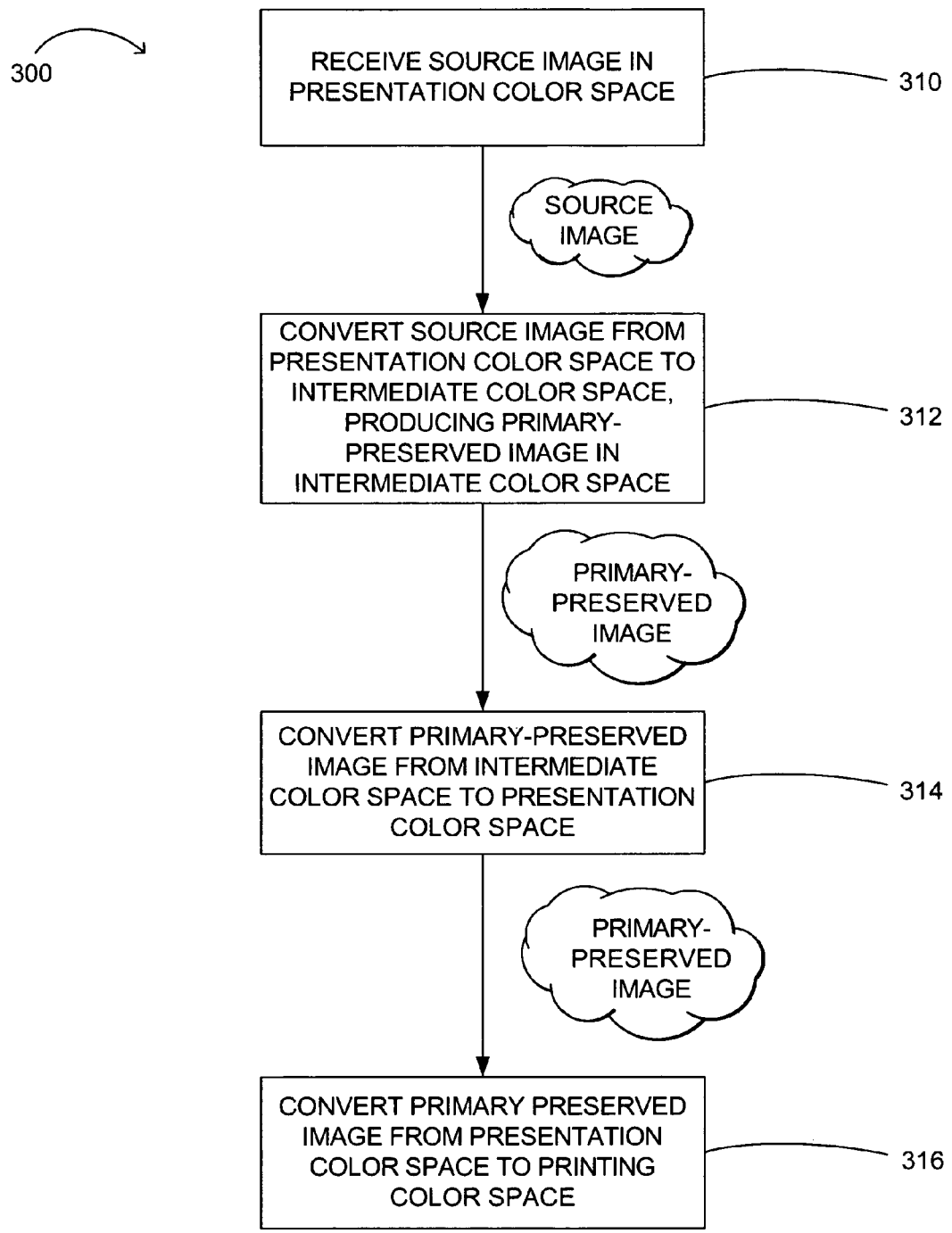
FIG. 4 is a flow diagram demonstrating communication of an image from a source device to a destination device, the image being converted from a presentation color space to an intermediate color space, preserving one or more primaries, and then back from the intermediate color space to the presentation color space, with one or more primaries still preserved, prior to conversion from the presentation color space directly to the printing color space.

FIG. 4 depicts a method of mapping a color from a presentation color space to a printing color space at 300. As indicated at 310, a source image is initially received from an image device, the received image typically being defined in a presentation color space. The source image then is converted from the presentation color space to an intermediate color space (typically a standardized color space such as the CIE XYZ color space) at 312. During this conversion to the intermediate color space, a primary-preserved image is produced in accordance with a conversion function which accommodates preservation of one or more colors (typically primary colors). Such methodology is described above in connection with FIGS. 1–3. The resultant primary-preserved image is in the intermediate color space (e.g. the CIE XYZ color space).

At 314, the primary-preserved image is converted from the intermediate color space back to the presentation color space, producing a primary-preserved image, now in the presentation color space. At 316, the primary-preserved image is converted from the presentation color space directly to the printing color space for printing. This methodology thus may be employed to reduce the risk of interpolation error, which may otherwise occur upon conversion directly from the intermediate color space to the printing color space. Such interpolation error is described further above.

Figure 5:
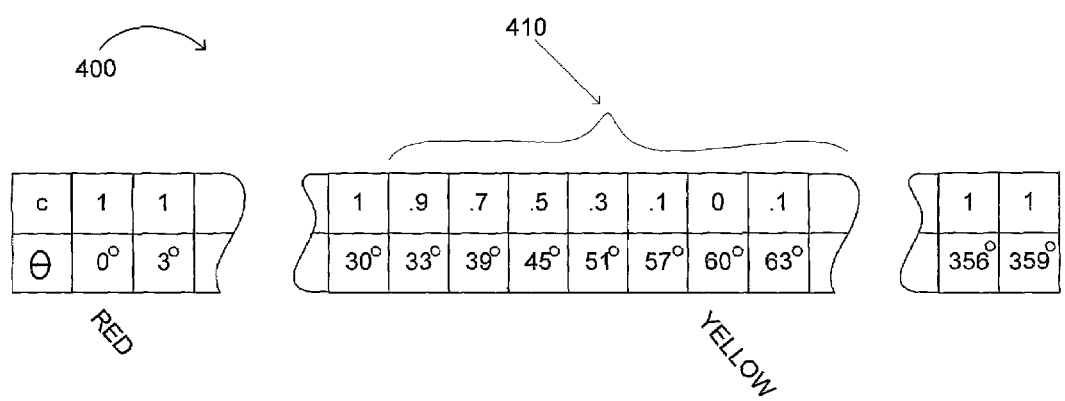
FIG. 5 is a weighting function look-up table demonstrating a relationship between hue angle of a color in the presentation color space and corresponding weighting factor used in combination of a device-converted color with a default-converted color to produce a resultant color in a destination color space.

FIG. 5 depicts is an exemplary look-up table 400 which demonstrates selection of weighting factor c based on hue angle θ of a source color. In look-up table 400 the color red is shown at 0-degrees and the to-be-preserved color, yellow, is shown at 60-degrees. In the depicted embodiment, it will be noted that the weighting factor remains at 1 between 0-degrees and 30-degrees, and then gradually decreases to 0 at 60-degrees (indicating that the yellow primary is to be preserved). The weighting factor then gradually increases between 60-degrees and 90-degrees (not shown), whereafter it remains again at 1.

In the depicted example, the weighting factor will be seen to vary linearly from 1 to 0, and the back to 1, in the indicated transition zone 410, but it will be appreciated that the invention is not so limited. The weighting factor may change non-linearly in a similarly gradual manner, or may simply fluctuate between 0 and 1. However, in the present preferred embodiment, weighting factor varies linearly between 0 and 1 through a span of +/−30-degrees. Furthermore, it should be appreciated, that 3-degree increments of hue angle are chosen for convenience of illustration, and an actual look-up table may be more or less precise.

Figure 6:
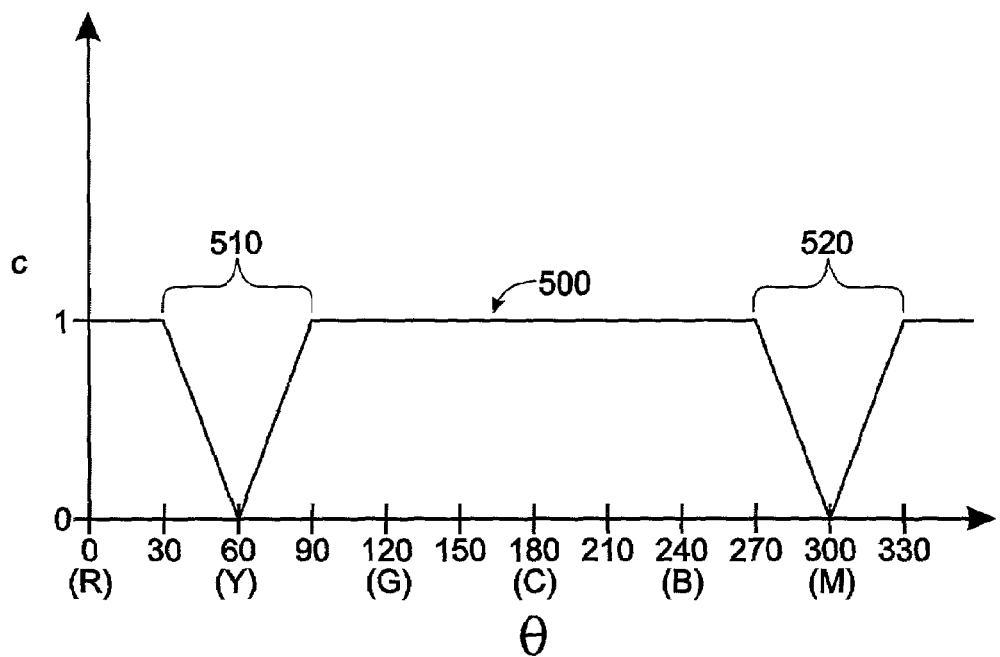
FIG. 6 is a graphical representation of a relationship between hue angle and weighting factor through three-hundred sixty degrees of hue angle, where yellow and magenta primaries are preserved.

FIG. 6 is a graphical representation of an exemplary relationship between hue angle θ and weighting function c. As should be apparent, a red primary corresponds to a hue angle of 0-degrees. A yellow primary corresponds to a hue angle of 60-degrees. A magenta primary corresponds to a hue angle of 300-degrees. Other primaries, green, cyan and magenta, correspond to hue angles 120-degrees, 180-degrees and 240-degrees, respectively.

In the depicted illustration, the weighting factor c varies between 1 and 0, such transition occurring +/−30-degrees on either side of a primary which is to be preserved. Accordingly, it should be apparent that FIG. 6 depicts a weighting factor characteristic 500 which demonstrates preservation of yellow and magenta primaries by setting the weighting factor to 0 at such to-be-preserved primaries. It also should be apparent that the depicted weighting factor characteristic effectively provides transition zones 510, 520 of primary preservation within +/−30-degrees hue angle of each to-be-preserved primary (yellow and magenta). The weighting factor is set to 1 outside of the transition zones.

Figure 7:
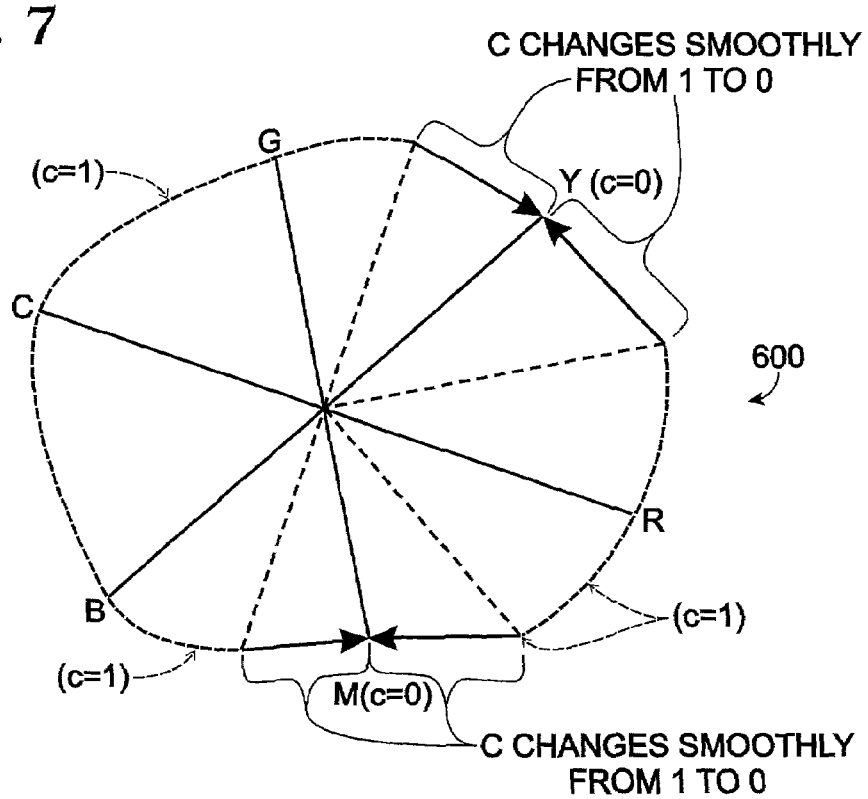
FIG. 7 is a schematic representation of a color gamut, showing weighting factors for use in preservation of yellow and magenta.

FIG. 7 is a schematic representation of a color gamut 600, providing yet another representation of weighting factors for use in preservation of one or more source colors. In FIG. 7, yellow and magenta colors are preserved. The various primary colors are shown according to their hue angle, with R (red) shown at 0-degrees. The perimeter of the color gamut is annotated with values of weighting factor c, dashed lines representing a weighting factor c equal to 1. Solid arrows toward primaries, yellow (Y) and magenta (M), represent transition of the weighting factor from 1 to 0. At the to-be-preserved primaries (yellow and magenta), the weighting factor is 0.

The disclosure set forth above may encompass multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A color management system comprising:
    an image device configured to present an initial-formatted color image defined in a presentation color space;
    a print processor configured to receive the initial-formatted color image from the image device, to convert the initial-formatted color image from the presentation color space to a destination color space using a device-specific profile to produce a device-formatted color image, to convert the initial-formatted color image from the presentation color space to the destination color space using a default profile to produce a default-formatted color image the default profile being adapted to preserve primary colors of the presentation color space, to produce a resultant color image in the destination color space with primary colors derived using the default profile and non-primary colors derived using the device-specific prolile by weighted combination of the device-formatted color image with the default-formatted color image, to convert the resultant color image from the destination color space to the presentation color space to produce a color-preserved color image in the presentation color space, and to convert the color-preserved color image from the presentation color space to a printing color space; and
    a print engine configured to pint the color-preserved color image in the printing color space.

2. The system of claim 1, wherein the image device is a monitor.

3. The system of claim 1, wherein the presentation color space is RGB color space.

4. The system of claim 1, wherein the destination color space is CIE XYZ color space.

5. The system of claim 1, which further comprises receiving the device-specific profile from the image device.

6. The system of claim 1, wherein the printing color space is CMYK color space.

* * * * *